United States Patent [19]

Ramp

[11] 4,073,752
[45] Feb. 14, 1978

[54] HIGH NORMALITY ION EXCHANGE MEMBRANES CONTAINING ENTRAPPED ELECTROSTATICALLY BULKY MULTICHARGED IONS AND METHOD OF PRODUCTION

[75] Inventor: Floyd Lester Ramp, Richfield, Ohio

[73] Assignee: The B. F. Goodrich Company, Akron, Ohio

[21] Appl. No.: 582,707

[22] Filed: June 2, 1975

[51] Int. Cl.$^2$ .............................. C08J 5/20; C08F 8/42
[52] U.S. Cl. ............................... 260/2.1 R; 260/2.1 E; 260/2.2 R
[58] Field of Search ............... 260/2.2 R, 80 L, 2.1 R, 260/2.1 E

[56] References Cited

U.S. PATENT DOCUMENTS

| | | | |
|---|---|---|---|
| 2,827,426 | 3/1958 | Bodomer | 260/2.2 R |
| 3,346,422 | 10/1967 | Berger | 260/2.1 E |
| 3,510,418 | 5/1970 | Mizutoni et al. | 260/2.1 E |
| 3,541,030 | 11/1970 | Boies et al. | 260/2.2 R |
| 3,743,595 | 7/1973 | Johnson, Jr. | 210/321 R |

OTHER PUBLICATIONS

Tolonto, 1972, vol. 14, pp. 219-262, Pergamon Press, Northern Ireland.

Primary Examiner—Joseph L. Schofer
Assistant Examiner—Peter F. Kulkosky
Attorney, Agent, or Firm—Alan A. Csontos

[57] ABSTRACT

Anionic and cationic exchange materials including membranes are beneficiated by a method involving swelling the ion exchange material in the presence of an electrically neutral Reagent A and then contacting the swollen material with a similarly electrically-neutral Reagent B selected to interact with A forming in situ in the ion exchange pathways of the ion exchange material a chemical substance or substances which ionize the membrane to form bulky multicharge entrapped ions of the same electrical sign as the covalently-bonded ion sites of the membrane material. The entrapped ions are electrostatically retained most tenaciously in the ion exchange channels of the membrane even when extracted with water or solvents and even when the membrane is put under electric stress as when current at high densities pass through the membrane in electrolytic chlorine processes, in dialysis cells, and the like. As compared to existing membranes having a concentration of covalently-bonded ion sites averaging about 0.05 to 0.1N, beneficiated membranes may be made having a critical electrolyte concentration between about 0.25 and about 10N. Beneficiated membranes at about 0.5 to 10N or higher reject ions of the same electric charge at ion concentrations well above those at which the original ion exchange material is effective. Outstanding properties of such beneficiated membranes are very high in transfer rates, low electrical resistivities, very high permselectivities allowing them to function under very high ion concentrations, and high resistance to penetration or fouling by nonionized salts, all without loss of the basic physical and chemical integrity of the original membrane. Beneficiated cation exchange membranes are especially useful in the electrolytic generation of chlorine.

6 Claims, 1 Drawing Figure

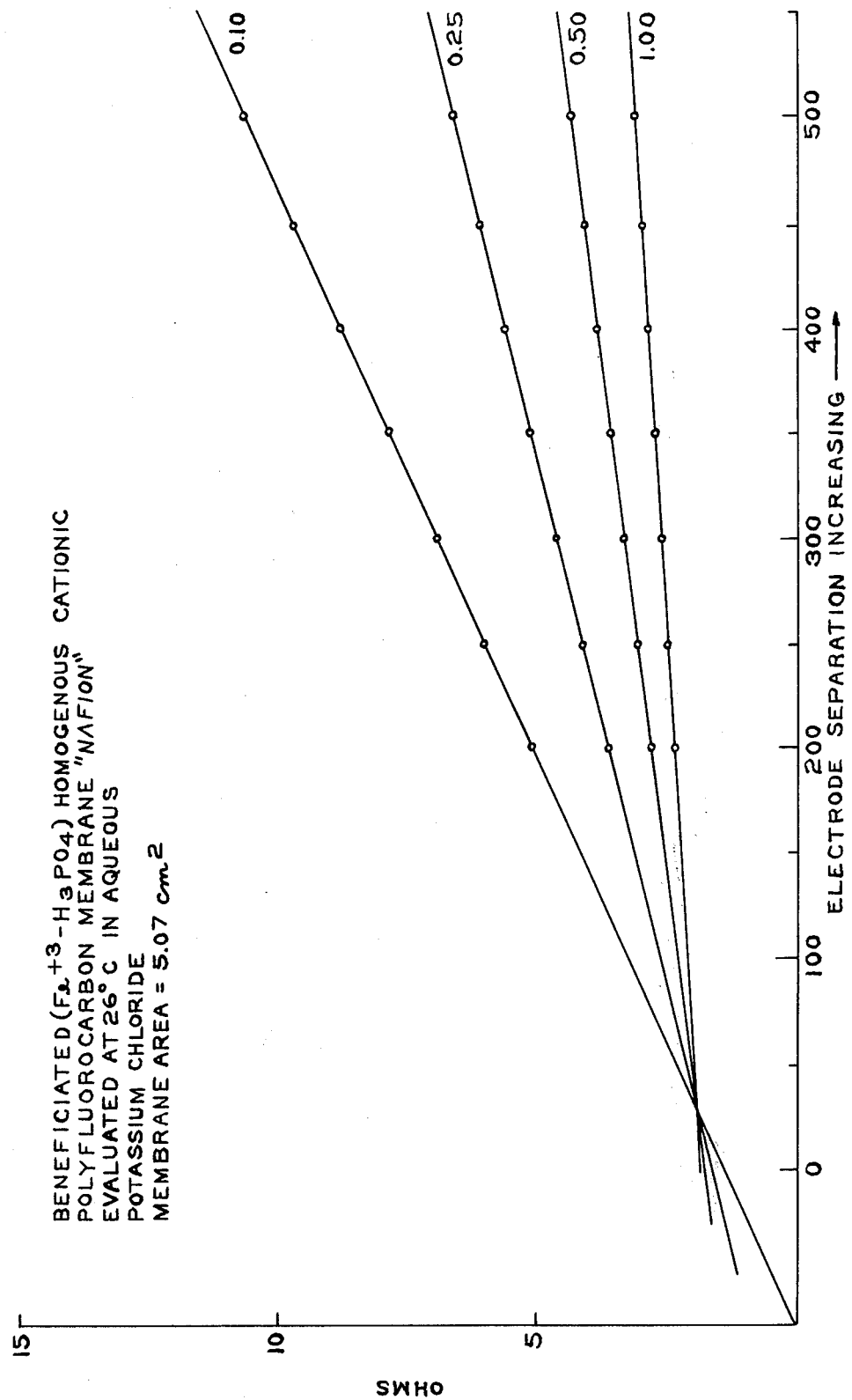

HIGH NORMALITY ION EXCHANGE MEMBRANES CONTAINING ENTRAPPED ELECTROSTATICALLY BULKY MULTICHARGED IONS AND METHOD OF PRODUCTION

CROSS REFERENCE TO RELATED APPLICATIONS

My copending application, Ser. No. 582,706 filed June 2, 1975, now U.S. Pat. No. 3,974,047, discloses and claims a low voltage, high efficiency, electrolytic process utilizing a beneficiated membrane of the present invention as a divider between a hot (ca 90°–105° C) anolyte solution essentially saturated in an alkali metal chloride such as potassium chloride and a similarly hot catholyte solution containing 10 – 70%/wt. of phosphoric acid conjointly producing elemental chlorine gas of high purity at the anode, high purity hydrogen gas at the cathode and forming in the catholyte solution high purity alkali metal phosphates low in chloride ion, particularly potassium phosphates of any desirable $K_2O:P$ ratio found so useful in fertilizer for arid agriculture and in lawn culture. My copending application, Ser. No. 582,708 filed June 2, 1915 now U.S. Pat. No. 3,974,047 discloses and claims a low voltage, high efficiency, electrolytic chlor-alkali process utilizing as a cell divider a beneficiated cation exchange membrane containing entrapped tantalum or niobium oxide complexes bearing eight electronegative charges, the process producing high purity chlorine gas at the anode and caustic essentially free of chloride ion in the catholyte in any desired concentration up to about 40%/wt.

BACKGROUND OF THE INVENTION

Modern ion exchange membranes are a compromise between, on the one hand, ion exchange capacity and permselectivity and, on the other, physical integrity of the membrane. The compromise is a very critical one allowing the membrane manufacturer little latitude. The "normality" or concentration of ion exchange sites in such existing membranes is from about 0.05 to 0.1N. Stated another way, the useful existing membranes contain about one covalently-bonded ionic site for about every 1200 molecular weight units. When the concentration of covalently-bonded ionic sites is increased by a very small amount to about one ion site for about 1100 molecular weight units, the membrane becomes much weaker in physical strength, it swells much too highly in water for many uses, loses some of its resistance to chemical degradation, and is otherwise unsuited to many uses under rigorous environments.

Anion exchange membranes have, in general, not been as satisfactory as cation exchange membranes. There is a particular need for anion exchange membranes of improved all around performance.

With a normality of only about 0.1, most existing membranes exhibit limited ion transfer rates, have a high electrical resistivity which may climb catastrophically in environments of high ion concentration, are easily penetrated and/or coated by nonionized metal salts, and have low permselectivities which permit cross-contamination of the two solutions separated by the membrane.

When existing cation exchange members are utilized as a divider in electrolytic generation of chlorine, the high anolyte alkali metal chloride concentrations required cause coating and/or penetration of the membrane by alkali metal chloride resulting in high cell voltage requirements.

Anion exchange membranes such as are utilized in dialysis cells have low rates of cation transfer and appear especially prone to becoming coated or fouled with deposits of metal salts, particularly salts of polyvalent metals such as may be present in the solution even in low concentrations as trace impurities. When this happens, cell operation is impeded and shutdown is required to remove the deposits from the membrane.

Water softening processes based on ion exchange resins and sea water desalinization processes are similarly low in efficiency because of low ion transfer rates and reduction in exchange efficiency due to polyvalent metal salt coatings, and penetration and plugging of the ion exchange pathways of the ion exchange material by salt-type materials.

The art of ion exchange resins is very badly in need of ion exchange materials in both granular and membrane forms having the ability to transport and/or take up the desired ion at high rates while essentially completely rejecting both nonionized salts and the unwanted coions at higher ion concentrations, i.e., cation exchange membranes which can essentially completely reject anions at higher ion concentrations yet which transport the desired cations at materially higher rates than existing membranes and anion exchange membranes which reject cations at higher ion concentrations while transporting the desired anions at materially higher rates than existing membranes.

The art of ion exchange membranes is in particular need of membranes efficiently operable under high ion concentrations near saturation and which can maintain physical integrity at high temperatures and is highly corrosive media.

SUMMARY OF THE INVENTION

The present invention solves the above and still other problems by providing very materially improved ion exchange materials particularly in membrane form. The present invention relates more specifically to novel, beneficiated membranes and a method of producing them. More specificaly, the present invention relates to specially beneficiated forms of existing or commonly known ion exchange membranes and their production, which membranes are fully and efficiently operable in applications involving high or essentially saturated ion concentrations, high operating temperatures, and corrosive materials, which applications have not been served in a practical manner by known ion exchange materials.

In accordance with the present invention, I have found that ion exchange materials may be beneficiated by a simple and low cost method involving first swelling the ion exchange material in the presence of an essentially electrically-neutral Reagent A and subsequently treating the swelled membrane with a similarly neutral Reagent B where Reagents A and B are known to interreact forming in situ in the ion exchange channels of the membrane a new chemical substance or substances which in aqueous media ionize strongly forming physically bulky, multi-charge ion sites of the same electric sign as that of the covalently-bonded ion sites already present in the membrane material. It should be understood that at least two reagents are usually required and additional third and/or fourth reagents and/or chemical treatments may be required. The ion sites thus added are not chemically-combined (i.e. covalently-bonded) with the material of the membrane but are electrostatically-entrapped by what is envisioned as push-push electrostatic repulsion forces set up between the entrapped ions and the covalently-bound ion sites originally present in ion exchange material.

When the entrapped ions are multi-charged (meaning more than one electric charge per ion) and the electric charges on each entrapped ion not only are of the same electric sign but also are not too remotely located thereon with respect to each other, the trapped ion is very tenaciously retained by the membrane material in aqueous media even under very high ion concentrations approaching saturation. While not wishing to be bound by theory, the entrapped ion should preferably be an ion approaching a bulky spherical shape rather than a long, thin chain-like ion.

The addition of the entrapped ions has little or no observable effect on the mechanical and chemical properties of the membrane whereas a similar concentration of ion sites covalently-bonded to the material of the membrane has drastic effects on the strength, swelling characteristics and chemical resistance of the same membrane material.

In the context employed herein, "electrically neutral" means reagents which either are in a form not strongly ionized or are materials not capable of ionization, at least to the extent that the penetration of the reagent is materially inhibited by the natural electric repulsion forces of the ion exchange material, per se. Where one wants one of the reagents to contain a metallic or other normally ionized moiety, it is usually possible to employ the reagent dissolved in one or more nonaqueous solvents or carrier liquid having the ability to swell the ion exchange material and wherein the reagent is not ionized or at least not very strongly. The use of organic, nonpolar swelling agents incapable of ionization but which are readily sulfonated as one reagent and the other a nonionized form of a sulfonating reagent such as dry sulfur trioxide vapors are an apt illustration of the use of electrically neutral reagents whereby strong organic sulfonic acids may be generated in situ and entrapped in the ion exchange channels of a cation exchange membrane. The use of an amine as one neutral reagent and a polyhalo-substituted hydrocarbon as the other illustrate the generation in situ in an anionic exchange membrane of a quaternary ammonium halide salt which ionizes strongly in aqueous media. The entrapped ions can be similar or quite different from the covalently-bonded ion sites of the original membrane as will appear herein but, of course, should have charges of the same electric sign.

As employed herein, the term "effective concentration" as applied to the ion site population "or critical electrolyte concentration" either of the starting material or membrane or of its beneficiated derivatives may not be too well understood in the art of ion exchange. As used herein, the term is based on my new method of characterizing ion exchange membranes as the latter is set forth in my paper presented before the International Society for Electrochemistry, Brighton, England, Sept. 22–27, 1974, and entitled "A New Method of Characterizing Ion Exchange Membranes". In such new method, the membrane is viewed as a solid solution of electrolyte, the concentration of which is measured and expressed as a "normality" ("N"). In this method, the membrane is mounted in a special conductivity cell having movable electrodes and employing an A.C. signal at 1000 Hz. The cell is filled with an electrolyte which usually is a pure alkali metal chloride or hydroxide such as KCl, NaCl or KOH. The method involves measuring the cell resistance at a number of electrode spacings and then repeating the measurements at each of a number of concentrations of the electrolyte. The data is then plotted with electrode gap as abscissae and cell resistance as ordinates forming a family of lines which intersect at a common point, identified herein as membrane resistivity ($R_m$) which is an inherent resistance function of the test membrane and is independent of the external electrolyte concentration at all such concentrations below the "critical electrolyte concentration"(see below), herein expressed by abbreviation "CEC".

The drawings are a representative plot of data utilizing a homogeneous cationic polyfluorocarbon membrane beneficiated with iron phosphate anions and KCl as the test electrolyte.

The resistance line representing the highest concentration of electrolyte at which the line passes through the common point of intersection represents the "critical electrolyte concentration" of the particular membrane where entrance of coions to the membrane begins to contribute significantly to the conductivity of the membrane. At all concentrations below such "critical electrolyte concentration" rejection of coions is essentially complete. In routine evaluation of membranes by this technique, it has been my custom to measure membrane resistances at progressively higher concentrations of electrolyte until a concentration is reached when the line plot fails to pass through the point of common intersection. The data will be reported herein with the "critical electrolyte concentration" expressed as being between the last two concentrations thus determined, i.e. the lower one being the last concentration where the line intersects and the higher one being the one where intersection did not occur. The data reported herein is based on the use of any of KCl, NaCl or NaOH as the electrolyte.

One can carry out the method by starting at very high electrolyte concentrations and progressively reducing the concentrations. The method requires in either mode of operation that the membrane be fully equilibrated with the electrolyte before the measurements are commenced. The virtues of this method include (1) ready checking of measured solution conductivities against published values, (2) any deviation from strick linearity of the plot line for any given concentration reveals equipment malfunction, and (3) the data is at least a qualitative indication of the suitability of the test membrane in electrolyte chlorine processes at ion concentrations indicated. The method determines an average resistivity of the membrane and allows the calculation therefrom of an average permselectivity.

It should be pointed out that not all ion sites in a membrane are measured accurately in accordance with that shown by a chemical analysis. Rather the "critical" concentration so measured is really an "effective concentration", especially in regard to beneficiated membranes, which concentration usually is lower than that shown by actual chemical analysis. The reasons for this discrepancy is believed to be related to nonuniform distribution of the fixed charges in the original membrane materials.

ION EXCHANGE MATERIALS

The nature of the original ion exchange material does not appear critical in the present invention since every ion exchange material appears susceptible to beneficiation by the method of this invention. Both anionic exchange materials and cationic exchange materials appear equally susceptible of treatment. Also, both the homogenous and heterogenous types of both cationic and anionic exchange membranes appear equally susceptible of treatment. The actual chemical composition of the membrane polymeric material appears to have little effect since a variety of such membrane polymeric materials have responded to the treatment.

There appears to be only one essential criteria for an ion exchange starting material and this is a minimum effective concentration of covalently-bound ion sites not less than about 0.01N as measured by my method using the $K^+$ion. Such a concentration is necessary to supply the repulsive forces which retain the entrapped ions. The maximum effective concentration of covalently-bound ion sites required in the starting membrane material is limited only by the degree of physical and chemical integrity needed in the beneficiated membrane and such maximum concentration differs little from that required in the original membrane, making the useful range of concentration for the covalently-bonded ions in the range of from about 0.01 to 0.20N, most preferably between about 0.05 and about 0.11N.

I have beneficiated the homogeneous (i.e., single phase) type of cation exchange made by a number of manufacturers. One such type of membrane (marketed by E. I. DuPont de Numours under the older designation "XR" and more recently under the newer "Nafion" trademark), is said to be a singlephase, clear film of polyfluorocarbon material containing about one covalently-bound sulfonic acid group for about every 1200 molecular weight units. Such a membrane is susceptible to a wide variety of beneficiation treatment to produce highnormality cation exchange membranes of unique utility. A heterogenous anionic exchange membrane useful in dialysis or electrodialysis and sold under the designation "IONAC MA 3475" (Ionac Corp.) and said to consist of a quaternized anion exchange resin dispersed in a chlorofluorocarbon plastic matrix has been beneficiated by soaking in tetramethyl ethylene diamine and then in 1,3-dibromopropane so it exhibits a resistivity of 20.1 ohms/cm$^2$ and an effective electrolyte concentration of 0.5N whereas the original membrane exhibits corresponding values of 47.8 ohms/cm$^2$ and 0.025N. A heterogeneous cation exchange membrane said to comprise a sulfonated polystyrene disperse phase carried in a polyfluorocarbon plastic matrix when beneficiated with iron phosphate complex ions is especially useful in electrolysis cells producing elemental chlorine. A homogenous Nafion membrane was treated with aqueous solutions of niobium $(Nb_6Cl_{12})^{+2}$ or tantalum chlorides $(Ta_6Cl_{12})^{+2}$ then treated with an oxidant to generate the pentavalent form of the metal, then with hydrogen peroxide to generate a peroxy form of the metal and lastly with KOH or NaOH so as to generate niobium or tantalum oxide complexes bearing about eight electro-negtive charges per ion. I have found the latter type of membrane to be highly resistant to the high concentrations of caustic present in the cathode compartment of a membrane cell version of an electrolytic chloroalkali process.

In the present invention fluorocarbon types of ion exchange materials and membranes are preferred. Preferred cation exchange membranes are the homogeneous and heterogenous forms of polyfluorocarbon and polychlorofluorocarbon matrix types. Preferred anion exchange membranes are the heterogenous membranes having a polychlorofluorocarbon matrix and a dispersed quaternary ammonium anion exchange resin as the disperse phase.

REAGENTS

The reagents useful in this invention are legion since nearly any chemical can be used if added in an appropriate nonionizing solvent or carrier liquid.

Polymerizable monomeric materials, preferably those vinylidene monomers containing at least a single $CH_2=C<$ group per molecule, form a very useful and very large preferred class almost all of which have in anhydrous form the requisite neutral character and the ability to swell the organic phases of an ion exchange membrane. Monomers of this type which may be employed include polymerizable acid anhydrides when employed in mixed monomeric materials including, for example, styrene; the monovinylidene resin forming monomers especially those which carry easily-sulfonated aromatic nuclei in their structure such as styrene, vinyl toluene, vinyl naphthalene and others; the alpha, beta-unsaturated monocarboxylic acids and their anhydrides such as acrylic acid, methacrylic acid, acrylic anhydride, and others which have inherent ionizing ability both in acid and salt forms; aminoacrylates such as beta-(N,N-dimethylamino)ethyl methacrylate which may be quaternized and/or otherwise reacted through the amino groups; halogen-containing monomers such as vinyl chloride and vinyl benzyl chloride and many others which may be quaternized by an amine or hydrolyzed and reacted to introduce ionizable groups; and many, many others.

Other highly useful reagents which may be employed are aromatic ethers such as diphenyl ether, the aromatic nuclei of which are very easily sulfonated.

Aromatic amines such as diphenylamine, triphenyl amine, the various naphthylamines, the various phenyl naphthylamines and other offer a beneficiating mode through sulfonation of the aromatic nuclei.

A very large class of highly useful reagents are the salts of polyvalent metals such as the salts of iron including iron chlorides, iron nitrates, and others, the corresponding salts of vanadium, niobium, tantalum, manganese, technicium, ruthenium, cobalt, iridium, palladium, platinum, aluminum, antimony, bismuth, the metals of the lanthanide series, and the metals of the actinide series. Preferred are compounds of polyvalent metals selected from the class consisting of iron and aluminum and most preferably compounds of those few metals, notably tantalum and niobium which can exist in a complex carrying eight negative charges.

Highly preferred and especially preferred metallic reagents are selected from the class consisting of iron, aluminum, platinum, palladium, ruthenium, rhodium, tantalum and niobium. Preferred cationic membranes beneficiated with compounds and complexes of these metals have special utility in the electrolytic generation of chlorine and contain electrostatically-entrapped multi-charged metal anion sites associated with materials selected from the class consisting of phosphoric acid/iron reaction products, phosphate/aluminum reaction products, the hydrous oxides of platinum, palladium, ruthenium and rhodium, and the highly electro negative oxide complexes of tantalum and niobium having the formula $[M_6O_{19}]^{-8}$ where M is a tantalum or niobium atom.

Still other regents and mixtures of two or more reagents may be utilized so long as they are sufficiently neutral to penetrate the membrane and they can combine to form compounds, complexes or mixtures of chemical materials inoizable to the multi-charge state (i.e. at least two electric charges per ion) in aqueous media.

The method of this invention is capable of producing ion exchange materials, particularly ion exchange membranes, having an effective total ion concentration of at least 0.25N Membranes which are preferred will have an ion concentration between about 0.5 and 10N with most preferred membranes having an effective total ion concentration between about 0.5 and about 5N. Cationic exchange membranes appear capable of acquiring a somewhat higher total anion concentration than the cation concentrations possible in anionic exchange membranes. Anion exchange membranes may be beneficiated so as to possess an effective total cation concentration between about 0.25N and about 3.5N, more preferably between about 0.5N and about 2.5N.

PROCEDURE

The two essential reagents usually may be employed in any order although in many combinations of reagents there usually is one of the reagents which is more readily imbibed by the materials of the membrane which swells the membrane more highly, or which stays in the membrane better and probably should be applied first. Where the reagent per se has little ability to penetrate or swell the membrane, as where normally solid inorganic metal compounds are employed, the use of an auxiliary, inert swelling liquid such as water or an organic solvent to swell the membrane and carry the reagent at least partially into the interior ion exchange pathways of the membrane is usually desirable. Ethers, alcohols, ketones, amines, glycols, hydrocarbons are a few of the neutral swelling liquids which may be employed as swelling agents or solvent or carrier for the reagents.

The two essential steps of the process, namely treatment with the two essential reagents may be carried out at any temperature consistent with membrane integrity in the range of from about 10° to about 125° C. While many treatments with the more readily imbibed and more reactive reagents work well at room temperature (ca 23° C), it is generally desirable to apply the reagent at temperatures from about 35° C to about 150° C to insure maximum swelling and maximized take-up of the reagent.

The membrane is simply immersed in the reagent liquid and allowed to soak therein. In some cases soaking times of 1 to 24 hours may be required to swell the membrane. Once fully swollen by the first-applied reagent, take-up of the second-applied reagent frequently is so much facilitated that prolonged soaking in the second reagent is not required. In such cases a mere dipping in the second reagent solution is all that is required. In other cases soaking in the second reagent for a period of time is required for migration to occur. Between the first and second reagent application steps it is usually desirable to blot, wipe or squeeze the surface of the membrane to remove the excess first reagent clinging to the membrane to avoid cross contamination of the solutions. Where the second reagent is a vapor treatment, as in a sulfonation step using sulfur trioxide vapors, more time may be required for the vapor to dissolve in the liquid content of the swollen membrane and reach the desired locus of reaction in the ion exchange pathways. Larger scale commercial sizes of membranes can be beneficiated in continuous loop equipment having rollers to guide continuous ribbons or loops of ion exchange material into and out of the solutions and/or through vapor treatment ovens.

The invention now will be described with relation to several specific examples which are intended to be exemplary only and not as limiting the scope of the invention in any way.

EXAMPLE 1

A "Nafion" cationic exchange membrane (DuPont) 3 mils in thickness is utilized as the starting membrane in this example. Such membrane is of the homogeneous type and is said to be a polyfluorocarbon plastic carrying about one covalently-bonded sulfonic acid group for about every 1200 molecular weight units. The as-received membrane is characterized by the method described above and found to exhibit a resistivitiy ($R_m$) of 7.12 ohms/cm$^2$ and a critical electrolyte concentration (expressed "CEC") of $0.075N > CEC > 0.05N$.

A sample of the as-received membrane material is soaked for several hours in a hot (ca 85° C) aqueous solution containing about 2%/wt. of ferric nitrate. Even though much of the original iron content of the solution appeared to have hydrolyzed and precipitated, the now colored membrane is removed, wiped free of excess solution and then immersed in a hot aqueous solution (ca 100° C) containing about 85%/wt. of phosphoric acid until the membrane is again colorless. The membrane is then washed extensively with distilled water and evaluated in the same fashion. The already low membrane resistance appeared not to have been much changed but its CEC was somewhat above 1.5N.

EXAMPLE 2

In this example, a procedure which is the reverse of that in the preceding example is employed. A second sample of the same Nafion membrane is immersed in hot 85%/wt. phosphoric acid for 24 hours at a solution temperature of 80° C. The membrane is then removed from the solution and the excess acid wiped off before the membrane is immersed in an aqueous solution at room temperature containing 1%/wt. of aluminum nitrate. The time of immersion is only a few minutes before the membrane is removed and rinsed off with distilled water. The $R_m$ of the membrane is 10.1 ohms/cm$^2$ and the concentration of anions evaluated by the procedure described in the text above. The anion concentration is $1.0N > CEC > 0.5N$ (i.e. between 0.5 and 1.0N), i.e. more than five times that of the original membrane. Such a membrane is useful in the electrolytic process described in my copending application referred to above utilizing an essentially saturated solution of KCl as an anolyte solution and a solution 10 to 70%/wt. in phosphoric acid as a catholyte producing chlorine and potassium phosphates useful as fertilizer additives.

EXAMPLE 3

A Nafion membrane similar to those of the preceding examples was soaked in solution containing 10 grams of triphenyl amine in 60 grams of diphenyl ether. The solution is at 100° C and the soaking is continued for six hours at that temperature. The membrane is removed and blotted dry before being placed in an excess of 10% fuming sulfuric acid and heated at 85° C for 16 hours.

The $R_m$ of the final beneficiated membrane is 12.2 ohms/cm$^2$ and the effective anion concentration was greater than 1.0N. In this example, it is believed that the benzene nuclei of both the triphenyl amine and the diphenyl ether are sulfonated forming strong sulfonic acids in the ion exchange pathways of the membrane which are not removed to any substantial extent when the membrane is washed with water.

EXAMPLE 4

In this example, an improved anionic exchange membrane is prepared. The starting membrane is a commercial membrane 18 mils in thickness marked as "Ionac MA3475" (Ionac Div. of Permutit Corp.) whichis a heterogenous type of membrane said to have a matrix of polychlorofluorocarbon plastic and a disperse quaternary ammonium(benzyl trimethyl ammonium) anion exchange phase. The membrane is soaked first in tetramethyl ethylene diamine for several hours at room temperature. The membrane is then removed, blotted dry and placed in a solution also at room temperature and containing 23 grams of 1,3-dibromopropane in 60 grams of hexane as an electrically neutral organic solvent for the bromo compound but having poor solubility for the amine. The membrane is then removed and rinsed with distilled water before being evaluated in the conductance cell. The $R_m$ of the membrane is 20.1 ohms/cm$^2$ and the cation concentration is expressed as: 0.5N>CEC>0.10. Such membrane would be very efficient in electro-dialysis. In contrast, the original untreated starting membrane has an $R_m$ of 47.8 ohms/cm$^2$ and an anion concentration expressed as 0.030N>CEC>0.025. The treatment thus increased the concentration of cation sites by an estimated 5X to 10X.

EXAMPLE 5

In this example, a series of Nafion membrane samples are beneficiated with iron phosphate ions with an attempt to secure varying amounts of iron pickup by varying the concentration of ferric chloride utilized as the Reagent B. In each case, the membrane is first soaked in 85%/wt. aqueous phosphoric acid at 80° C for 16 hours and then immersed in the aqueous solutions given below for the time interval also indicated:

| | Resistivity Ohms/cm$^2$ | CEC |
|---|---|---|
| a) 2%/wt. FeCl$_3$/30 sec. | 8.58 | >1.0N |
| b) 2%/wt. FeCl$_3$/2 min. | 6.6 | >1.0N |
| c) 2%/wt. FeCl$_3$/10 min. | 8.7 | 1.0N>CEC>0.5N |
| d) 10%/wt. FeCl$_3$/30 secs. | 7.7 | 1.0N>CEC>0.5N |

It appears that use of a 10%/wt. solution for 30 seconds is about as good as 2 - 10 minutes in the 2% solution.

EXAMPLE 6

In this example, an "Ionac MC3470" heterogenous cation exchange membrane said to be a polychlorofluorocarbon matrix and a sulfonated crosslinked polystyrene disperse phase having in its as-received condition an $R_m$ of 16.5 ohms/cm$^2$ and an anion concentration expressed as 0.1N>CEC>0.05 is treated by an in situ polymerization technique. The membrane is soaked for several hours in monomeric styrene containing a small proportion of benzophenone as a U.V. active polymerization initiator. The membrane is then irradiated with U.V. light for about 16 hours employing an RS sunlamp (150W) at a distance of about 8 inches to polymerize at least a portion of the imbibed styrene. The membrane is finally soaked in 10% fuming sulfuric acid at room temperature for 16 hours. The membrane is washed free of excess acid with water and then characterized as before. The beneficiated membrane exhibits an $R_m$ of 5.07 ohms/cm$^2$ and an anion concentration expressed as: 0.5N>CEC>0.10. Such a membrane functions well in the electrolytic generation of chlorine from KCl and H$_3$PO$_4$ solutions as described in my copending application referred to above.

EXAMPLE 7

A Nafion homogenous cation exchange membrane similar to those of the preceding examples is soaked for 48 hours at room temperature in an aqueous solution containing Niobium pentachloride dissolved in 36%/wt. of hydrofluoric acid. After removal and blotting of the excess acid, the membrane is immersed for one-half hour in concentrated KOH. The resulting membrane exhibits an $R_m$ of 7.12 ohms/cm$^2$ and an anion concentration expressed as 0.25>CEC>0.10.

EXAMPLE 8

A similar "Nafion" cation exchange membrane is soaked in an equal mixture of monomeric acrylic acid and ethanol for 16 hours at room temperature. The membrane is then blotted dry and immersed in chloroform containing about 2 grams of isopropyl peroxypercarbonate polymerization catalyst for 16 hours at room temperature. The chloroform in this procedure is a solvent for the catalyst having reduced ability to dissolve the imbibed acrylic acid.

The membrane is removed and blotted dry before being soaked for several hours in 1N aqueous solution of KOH to neutralize the carboxyl groups of the acrylic acid polymerized in the membrane. The $R_m$ of the membrane is 10.1 ohms/cm$^2$ and the anion concentration is expressed as 1.0N>CEC>0.5N.

EXAMPLE 9

The polyacrylic acid beneficiated membrane of the preceding example is placed in 30% fuming sulfuric acid for 14 hours at room temperature. The membrane is removed and washed thoroughly in distilled water before being characterized by my method described above utilizing NaOH electrolyte. The $R_m$ of the membrane is very low, only 3.34 ohms/cm$^2$, and the total effective anion concentration is over 3N, The resulting homogenous cation exchange membrane would be useful in the electrolytic generation of chlorine from KCl and phosphoric acid solutions.

EXAMPLE 10

A "Nafion" homogenous cation exchange membrane similar to that employed in the preceding examples is soaked for several hours at room temperature in a saturated solution of compound I (below) in ethanol.

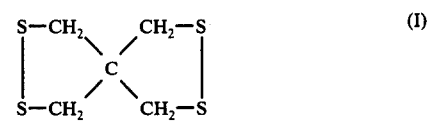

(I)

The membrane is removed, blotted dry and placed in an aqueous solution containing equal volumes of (1)

50%/wt. of acetic acid and (2) 30% aqueous hydrogen peroxide. These conditions are known to convert compound (I) to tetramethylmethane tetrasulfonic acid, a very strong sulfonic acid. The membrane is washed thoroughly with water and then tested in the conductance cell by my new method outlined in the text above. The $R_m$ of the membrane is very low, only 3.04 ohms/cm$^2$ and the anion concentration is 1.0N>CEC>0.5N. Such membrane would also be useful in the KCl/H$_3$PO$_4$ chlorine process of my co-pending application.

EXAMPLE 11

A "Nafion" homogenous cation exchange membrane similar to those of the preceding examples is soaked for several hours at room temperature in an aqueous solution containing an excess of $(Ta_6Cl_{12})^{+2}$. The membrane is observed to change to a green color. The membrane is removed and placed at room temperature in water saturated with chlorine and made acidic with hydrochloric acid for 72 hours of soaking. The membrane is observed to become red-brown in color during this treatment. The solution and membrane are heated to 60° C. for an additional 20 hours during which the membrane is observed to become colorless. The membrane is then immersed in an ice-cold aqueous solution containing 30%/wt. of hydrogen peroxide for a total time of 30 minutes. The membrane is again blotted dry and immersed for about 20 minutes in an ice cold concentrated KOH solution. The latter solution and the membrane are heated briefly to boiling to ensure complete conversion of the tantalum in the membrane to $[Ta_6O_{19}]^{-8}$. The membrane is then washed thoroughly in water and characterized by my method. The $R_m$ of the resulting beneficiated membrane is very low at only 3.4 ohms/cm$^2$ and the CEC is greater than 4.0N. The resulting membrane is very efficient in an electrolytic chlor-alkali process operating with cathode caustic concentrations up to 20%/wt.

EXAMPLE 12

In this example, a "Nafion" homogenous cation exchange membrane similar to those of the preceding examples is soaked for many hours at room temperature in a solution of ruthenium trichloride trihydrate in water to effect a maximized take-up of ruthenium atoms by the covalently-bound sulfonic acid groups of the membrane. The membrane is then blotted dry and immersed in a saturated aqueous caustic potash solution containing solid lumps of excess KOH to hydrolyze the chlorine atoms on the ruthenium atoms in the membrane to a hydrous form of ruthenium oxides. The resulting membrane is washed in water and characterized by my method. The $R_m$ of the treated membrane is very low, only 2.5 ohms/cm$^2$ and the anion site concentration is: 1.0N>CEC>0.5N. This membrane would be useful in an electrolytic chlor-alkali process for chlorine.

EXAMPLE 13

A "Nafion" homogenous cation exchange membrane beneficiated with iron phosphate ions ($R_m$ = 9.5 ohms-cm$^2$ CEC>1.0N) is employed in the electrolytic process described in my copending application, Ser. No. 582,706 filed June 2, 1975. The membrane is installed in a vertical chlorine cell similar to a diaphragm cell employing a ruthenium-coated, oil-impregnated graphite cathode and an anodized graphite anode. The cell had an active membrane of 35 cm$^2$. A current of 4 amperes was used. The cell was operated under a variety of condtions.

I.

Anolyte — Potassium chloride solution saturated at 95° C.
Catholyte — Potassium phosphate (ph 5) current efficiency on chlorine >99%.

II.

Anolyte — Potassium chloride solution saturated at 95° C.
Catholyte — Potassium phosphate (ph 9) current efficiency on chlorine >99%.

III.

Anolyte — Potassium chloride solution 30g/100ml.
Catholyte — Potassium phosphate (ph7)

| current density | temperature | cell voltage |
|---|---|---|
| 100 amperes/sq. st. | 90° C | 2.4 |
| 300 amperes/sq. ft. | 90° C. | 3.1 |

At equilibrium the phosphate ion transported 0.19% of the current based upon phosphate in the catholyte.

I claim:

1. An organic polyfluorocarbon ion exchange material containing an effective total ion concentration of at least 0.25N and comprising from about 0.01 to about 0.2N of ion sites originally present on and covalently-bonded to the material of said ion exchange material and the remaining ion sites being electrostatically bulky multi-charged ions of electric sign the same as said covalently-bonded ion sites and entrapped in the ion exchange pathways of the said ion exchange material.

2. An ion exchange material as defined in claim 1 and further characterized by membrane form, by said covalently-bonded ion sites being sulfonic acid groups, and the said entrapped ion sites being electro negative metal anion sites associated with materials selected from the class consisting of phosphoric acid/iron reaction products, phosphoric acid/aluminum reaction products, the hydrous oxides of platinum, palladium, ruthenium and rhodium, and the highly electro negative oxide complexes of tantalum and niobium having the formula $[M_6O_{19}]^{-8}$ where M is a tantalum or niobium atom.

3. An ion exchange material as defined in claim 1 and further characterized by membrane form, by said membrane being a polyfluorocarbon plastic, by said covalently-bonded ion sites being sulfonic acid groups present in a concentration between about 0.05 and about 0.11N, by the said entrapped ion sites being anion sites electrostatically retained by interaction with said sulfonic acid groups and comprising iron phosphate anions, and by the said effective ion concentration being between about 0.5 and about 5N.

4. An ion exchange material as defined in claim 1 and further characterized by membrane form, by said membrane comprising a matrix of polychlorofluorocarbon plastic and a quaternary ammonium polymeric salt as a disperse phase present in a concentration between about 0.01 and about 0.2N, by said trapped ions being quaternary ammonium halide salt products electrostatically-entrapped in the ion exchange pathways of said membrane, and by said effective total ion concentration being between about 0.5 and about 3.5N.

5. An ion exchange material as defined in claim 1 and further characterized by membrane form, by said membrane comprising a polychlorofluorocarbon plastic matrix and a sulfonated, crosslinked polystyrene disperse phase present in a concentration between about 0.05 and about 0.11N in covalently-bonded sulfonic acid groups, by said trapped ions being iron phosphate anions electrostatically-entrapped in the ion exchange pathways, and by said total effective ion concentration consisting of anions present in a concentration between about 0.5 and about 5N.

6. The method of increasing the total effective ion concentration of an organic polyfluorocarbon ion exchange material containing between about 0.01 and 0.2 N of covalently-bonded ion sites to a total effective ion concentration of at least 0.25N comprising swelling said organic polyfluorocarbon material in the presence of an essentially electrically neutral Reagent A selected from the group consisting of vinylidene monomers containing at least a single $CH_2=C<$ group per molecule, aromatic ethers, aromatic amines, and salts of polyvalent metals and treating the resulting swollen material with an essentially neutral reagent known to interact with said Reagent A forming reaction products ionizable in water to form electrostatically-bulkyl multicharged ions of the same electric charge as said covalently-bonded ions.

* * * * *